united States Patent [19]  [11]  4,242,236
Blakely  [45]  Dec. 30, 1980

[54] 65-130 ANGSTROM MEAN RADIUS SILICA-ALUMINA CATALYST SUPPORT

[75] Inventor: Donald W. Blakely, Oakland, Calif.

[73] Assignee: Chevron Research Company, San Francisco, Calif.

[21] Appl. No.: 25,222

[22] Filed: Mar. 29, 1979

[51] Int. Cl.³ .............................................. B01J 21/12
[52] U.S. Cl. ............................................... 252/455 R
[58] Field of Search ................................... 252/455 R

[56] References Cited

U.S. PATENT DOCUMENTS

| | | | |
|---|---|---|---|
| 3,033,801 | 5/1962 | Kloepfer | 252/455 R |
| 3,393,148 | 7/1968 | Bertolazini et al. | 208/111 X |
| 3,471,399 | 10/1969 | O'Hara | 252/455 R |
| 3,657,153 | 4/1972 | Bucur et al. | 252/455 R |
| 3,661,805 | 5/1972 | Horvath | 252/465 |
| 4,051,021 | 9/1977 | Hamner | 252/455 R |
| 4,113,656 | 9/1978 | Riley et al. | 252/455 R |
| 4,134,856 | 1/1979 | Itoh et al. | 252/455 R |

*Primary Examiner*—Carl F. Dees
*Attorney, Agent, or Firm*—D. A. Newell; W. H. Hooper; A. H. Uzzell

[57] ABSTRACT

A catalyst support comprised of alumina and silica is disclosed having a mean pore radius ranging from about 65 to about 130 Angstroms, a total pore volume from about 0.75 to about 1.3 ml/g and a total surface area ranging from about 150 to 300 m²/g. The support may be prepared by peptizing and mulling a mixture of alpha alumina monohydrate with a fumed silica, neutralizing the mixture; extruding the neutralized mixture and drying and calcining same.

1 Claim, No Drawings

65-130 ANGSTROM MEAN RADIUS SILICA-ALUMINA CATALYST SUPPORT

BACKGROUND OF THE INVENTION

1. Field of the Invention

This invention relates to a silica-alumina catalyst support having a median pore radius ranging from about 65 to about 130 Angstroms and having a total pore volume ranging from about 0.75 to about 1.3 ml/g. The support is particularly useful as a base for hydrotreating catalysts in the desulfurization of heavy petroleum feedstocks.

2. Description of the Prior Art

Heavy hydrocarbon feedstocks such as crude oil, atmospheric distillation column bottoms or reduced crude oil, and vacuum residuum, often have a high sulfur and high metals content. The metals normally comprise nickel, vanadium and iron, and the sulfur is normally in the form of sulfides and/or mercaptans. Removal of these impurities is usually required to prodce clean transportation or heating fuels and to facilitate various downstream refinery processes.

Desulfurization and demetallation are advantageously accomplished by passage of the hydrocarbon feedstock over a catalyst in the presence of hydrogen. Commonly used catalysts for this purpose include Group VI-B and Group VIII metals, their oxides or sulfides, on alumina or silica-alumina supports.

It has long been recognized by those knowledgeable in the art that the catalyst support characteristics such as surface area, pore volume and pore size distribution play a vital role in the activity and stability of the selected catalyst. If the support pore volume is comprised primarily of small-diameter pores, such as pores having a median radius of approximately 35 Angstroms, the catalyst tends to foul more rapidly than catalysts having larger pores, and the rate of reaction is diminished due to the slow diffusion rate of the impurity-bearing hydrocarbon molecules through the smaller diameter pores. Thus, attention has focused upon the preparation and discovery of suitable support materials having the desired pore characteristics.

The following references disclose certain catalysts and/or supports which were formulated in attempts to overcome the deficiency of the prior art catalysts:

U.S. Pat. No. 3,876,523 discloses hydrodemetallation and hydrodesulfurization alumina-based catalysts having an average pore diameter between 150 to 250 Angstroms.

U.S. Pat. No. 3,891,514 discloses a demetallation and desulfurization catalyst comprising a hydrogenation component composited with an alumina support, the pores of which are distributed over a range of 180 to 300 Angstroms in diameter and having a surface area in the range of 40 to 70 m$^2$/g.

U.S. Pat. No. 3,393,148 discloses a hydroprocessing catalyst comprising a hydrogenation component in a large-pore-diameter alumina having a surface area ranging from 150–500 m$^2$/g and an average pore diameter ranging from 100 to 200 Angstroms.

U.S. Pat. No. 3,471,399 discloses a hydrodesulfurization catalyst comprising silica-alumina and a hydrogenation component, said catalyst having an average pore diameter ranging from 70 to 90 Angstroms and a surface area of about 150–250 m$^2$/g.

U.S. Pat. No. 3,322,666 discloses a hydrodesulfurization catalyst comprising a hydrogenation component on an alumina support which has the majority of its pores in the 15–50 Angstrom radius range.

U.S. Pat. No. 4,066,574 discloses a hydrodesulfurization catalyst having an alumina support, which support has at least 70 volume percent of its pore volume in pores having a diameter between 80 and 150 Angstroms and less than 3 volume percent of its pore volume in pores having a diameter above 1000 Angstroms.

None of the above patents, however, teach the use or preparation of a silica-alumina support having the particular pore size distribution disclosed herein.

SUMMARY OF THE INVENTION

In accordance with the present invention, there is provided a catalyst support comprised of alumina and silica having a mean pore radius ranging from about 65 to about 130 Angstroms. The total pore volume of the support ranges from about 0.75 to about 1.3 ml/g and the support has a surface area ranging from about 150 to 300 m$^2$/g.

Further in accordance with the invention, the support may be prepared by the method comprising: mulling a mixture of alpha-alumina monohydrate or an Al+3 salt with fumed silica and a peptizing agent; substantially neutralizing the mulled mixture; and extruding the neutralized mixture. The extrudate may be impregnated at this stage or may be dried and calcined prior to impregnation with active catalytic metals. The peptizing agent may comprise a strong acid or a strong base, such as nitric acid or tetramethyl ammonium hydroxide solution.

Furthermore, the catalyst support of the present invention may be prepared by mulling a mixture of fumed alumina and fumed silica with a peptizing agent, neutralizing the mulled mixture and extruding. As in the above method, the extrudate may be dried and calcined prior to impregnation of the active catalytic components.

DESCRIPTION OF THE PREFERRED EMBODIMENTS

The catalyst supports of the present invention are comprised of silica and alumina and exhibit a pore structure especially suitable for hydroteating crude feedstocks and residuum. As used herein, the term "hydroteating" is intended to encompass the contacting of a hydrocarbon feed with a catalyst in the presence of hydrogen for the purpose of removing heteroatoms such as sulfur, nitrogen, oxygen and metallic components such as nickel, vanadium and iron from the feedstock. The term also includes processes for saturating aromatics and/or olefins in the feedstock and hydrocracking said feedstock.

The supports of the present invention may be impregnated by conventional methods with the desired metals. For example, the support may be immersed in a solution containing the salts of Group VI-B and/or Group VIII metals to produce a hydrodesulfurization catalyst. Alternatively, the catalytically active metals or compounds thereof may be directly comulled and extruded with the support.

The silica-alumina support of the present invention is prepared by mulling a mixture of fumed silica with alpha-alumina monohydrate, or an Al+3 salt or fumed alumina, and a peptizing agent to form an extrudable plastic or doughy mass. The dough should then be substantially neutralized and extruded. Preferably the final extrusion mix will comprise 55-60% volatiles. At this juncture, the extrudate particles may be impregnated with the desired catalytic metals or dried and calcined prior to impregnation. The extrusion operation is suitably effected with commercial extrusion equipment such as the auger or ram-type apparatus which forces the dough through a perforated plate or die. The extrudate may be cut into particles of desired length prior to drying and calcining by means of a rotating knife as the extrudate emerges from the die plate. Alternatively, the extrudate may be broken into rods of random length during the drying and calcining process. In any case, the extrudate is dried and calcined, drying being usually accomplished at temperatures up to about 200° C. for a period of several hours and calcining being preferably effected in an oxidizing atmosphere, such as air, at a temperature of from about 315° C. to about 650° C. over a period from about 0.5 hour to about 6 hours.

Preferably, the peptizing agent will comprise either a strong acid or strong base. The strong acids include hydrochloric acid, sulfuric acid and hydrofluoric acid, but nitric acid is preferred. Strong bases which may be used include sodium hydroxide, potassium hydroxide, ammonium hydroxide and tetraalkyl ammonium hydroxide solutions.

Sources of fumed silica are commercially available or may be prepared by the reaction of silicon tetrachloride with hydrogen and oxygen in a flame to form a very fine fumed silica and hydrochloric acid. Similarly, fumed aluminas are commercially available or said aluminas may be prepared by the flame hydrolysis of anhydrous aluminum chloride.

The catalyst support of the present invention has a mean pore radius ranging from about 65 to about 130 Angstroms, less than 10% of the total pore volume comprised of macropores, a total pore volume ranging from about 0.75 to about 1.3 ml/g, and a total surface area of about 150-300 $m^2/g$.

As used herein, the term "macropore" includes those pores having a diameter of 1000 Angstroms and above.

The pore diameters referred to herein are determined by mercury penetration porosimetry techniques. The surface tension of the mercury was taken as 473 dynes/cm at 25° C. and a contact angle of 2.443461 radians was used.

The term "median pore radius", as used herein, means that 50% of the pore volume is above the given radius and 50% of the pore volume is below the given radius.

EXAMPLES I-V

In the following examples, Catalysts A, B, C and D were prepared in accordance with the teachings of the present invention. Catalyst E was prepared in accordance with the prior art. The pore volumes, surface area and mean pore diameters are shown in the following table.

EXAMPLE I

In the preparation of Catalyst A, 100 g of fumed silica and 62.5 g of alpha-alumina monohydrate were mixed as dry powders. The mixture was peptized with 13 $cm^3$ of nitric acid and 250 g of water and mulled for approximately 15 minutes. The mixture was then neutralized to a pH of 7 with 25 g of ammonium hydroxide, extruded through a double die plate to produce 0.32-cm extrudates and air-dried overnight. The material was calcined at 204° C. for 4 hours and 510° C. for 6 hours. The radial pore size distribution as determined by mercury porosimetry techniques was broad, ranging from 100 to 260 Angstroms, with a maximum at 230 Angstroms and very few macropores.

EXAMPLE II

To prepare Catalyst B, the same amounts of alumina and silica as used in Example I were mixed as dry powders. Seventy-seven grams of 25% tetramethyl ammonium hydroxide solution and 200 grams of water were added to the mixture and mulled. The plastic or doughy mixture was neutralized with 1.5 g of nitric acid, extruded, dried and calcined as in Example 1. The mercury porosimeter showed a narrower pore distribution, centered at approximately 200 Angstroms.

EXAMPLE III

To produce Catalyst support C, 50 g of fumed alumina and 100 g of fumed silica were mixed, peptized, neutralized, extruded, dried and calcined as in the preceding example. The mercury porosimeter indicated a pore size distribution maximum at approximately 230 Angstroms.

EXAMPLE IV

To prepare Catalyst D, 50 g of fumed alumina and 100 g of fumed silica were peptized with nitric acid and neutralized with ammonium hydroxide, extruded, dried and calcined as in the first example. The pore size maximum was centered at approximately 100 Angstroms and the nitrogen surface area was 150 $m^2/g$.

EXAMPLE V

An example of the prior art, Catalyst E, was prepared by mixing 90 g of colloidal silica with 54 g of alpha-alumina monohydrate. The mixture was peptized with 12 of nitric acid, mulled, and neutralized with ammonium hydroxide. The mixture was extruded into 0.32-cm diameter particles, and dried and calcined as in Example I.

TABLE I

| | Catalyst Support | | | | |
|---|---|---|---|---|---|
| | A | B | C | D | E |
| Hg Total Pore volume (PV) (ml/g) | 0.854 | 0.88 | 1.26 | 1.20 | 0.633 |
| Hg Total Surface Area ($m^2/g$) | 205.5 | 249.8 | 239.6 | 172.3 | 207.3 |
| Micropore Mean Diameter (Angstroms) | 137.4 | 138.6 | 198.4 | 226.4 | 98.3 |
| %PV in Macropores | 1.17 | 1.7 | 6.3 | 7.0 | 13.8 |
| Hg Micropore Volume (ml/g) | 0.844 | 0.864 | 1.179 | 1.114 | 0.549 |

As reflected in Table I, the total pore volumes of the supports of the present invention are 35 to 100% greater than the pore volumes of conventionally prepared supports. Furthermore, the micropore mean diameters of supports made in accordance with the present invention are approximately 40 to 100% greater than the mean diameters of the prior art supports.

EXAMPLES VI-XII

Seven additional catalysts, having varying silica to alumina ratios, were prepared using the technique described in Example I. Table II shows the pore structure of these catalysts, designated as catalysts F through L, and the observed decrease in mean pore diameter with decreasing quantities of fumed reactant.

TABLE II

| | F | G | H | I | J | K | L |
|---|---|---|---|---|---|---|---|
| Silica Content (wt. %) | 100 | 90 | 75 | 50 | 30 | 10 | 0 |
| Volume (ml/g) | 1.26 | 1.20 | 1.0 | .58 | .46 | .42 | .33 |
| BET Surface Area, (m$^2$/g) | 220 | 224 | 232 | 254 | 247 | 240 | 220 |
| Micropore Mean Diameter, (Angstroms) | 178 | 180 | 164 | 94 | 71 | 71 | 61 |
| % PV in Macropores | 13.5 | 5.0 | 3.6 | 1.2 | 1.5 | 1.2 | 1.3 |
| Hg Micropore vol. (ml/g) | 1.05 | 1.14 | 0.96 | 0.57 | .45 | .41 | .37 |

EXAMPLE XIII

Catalyst M was prepared from Al(NO$_3$)$_3$.9H$_2$O and fumed silica. Three hundred seventy-five grams of Al(NO$_3$)$_3$.9H$_2$O were dissolved in 1500 cm$^3$ of H$_2$O and mixed with 120 grams of fumed silica slurried in 2000 ml of H$_2$O. The total mixture was neutralized in two steps to a pH of approximately 7.8, filtered, extruded, dried and calcined. Catalyst M exhibited a total Hg pore volume of 1.36 cm$^3$/gm, a Hg surface area of 243 m$^2$/gm, a mean micropore diameter of 232 Angstroms and only 4.6% of the pore volume was comprised of macropores.

EXAMPLE XIV

Catalyst N was prepared from 62.5 grams of alpha Al$_2$O$_3$.H$_2$O and 100 grams of fumed silica. As in example I, the catalyst was peptized with 13 cm$^3$ of HNO$_3$ and 250 gm of water and mulled for approximately 15 minutes. 39.2 gm of ammonium heptamolybdate and 11.2 gm of cobalt carbonate were added and mulled with the peptized mixture, neutralized with NH$_4$OH, extruded, dried and calcined. The resulting catalyst exhibited a Hg pore volume of 1.31 cm$^3$/gm, a Hg surface area of 220 m$^2$/gm, a mean micropore diameter of 264 Angstroms and only 1.8% of the pore volume was comprised of micropores.

What is claimed is:

1. A catalyst support comprised of alumina and silica having a mean pore radius ranging from about 65 to about 130 Angstroms; a total pore volume from about 0.75 to about 1.3 ml/g; and a total surface area ranging from about 150 to 300 m$^2$/g.

* * * * *

UNITED STATES PATENT AND TRADEMARK OFFICE
CERTIFICATE OF CORRECTION

PATENT NO. : 4,242,236
DATED : December 30, 1980
INVENTOR(S) : Donald W. Blakely It is certified that error appears in the above—identified patent and that said Letters Patent are hereby corrected as shown below:

Col. 1, line 22, "Prodce" should read --Produce--

Col. 2, line 47, "hydroteating" should read --hydrotreating--

Col. 5, line 5, "Volume" should read
        --Hg Total Pore Volume--

Col. 5, line 6, "L " should read  --L      --
         .33                         Blank Col. 5, line 10, "J  K" should read --J  K--
         71 71                        71

Signed and Sealed this

Fourteenth Day of April 1981

[SEAL]

Attest:

RENE D. TEGTMEYER

Attesting Officer     Acting Commissioner of Patents and Trademarks